3,170,866
PROCESS FOR STABILIZING LIQUIDS
Carl J. Wendt, Jr., Los Angeles, Calif., assignor to The Ralph M. Parsons Company, Los Angeles, Calif., a corporation of Nevada
Filed Mar. 13, 1961, Ser. No. 95,299
1 Claim. (Cl. 208—350)

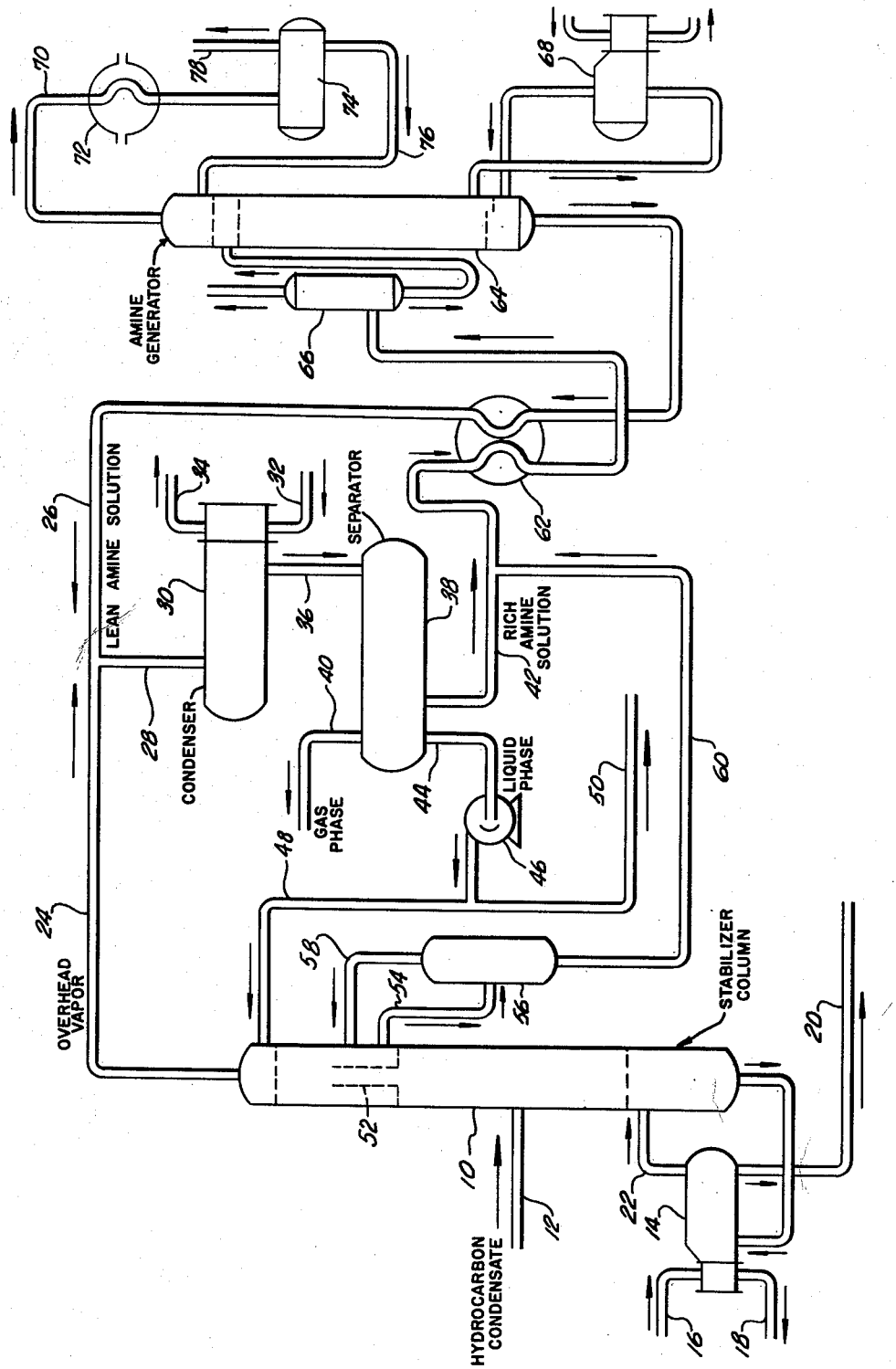

This invention is related to a process for stabilizing liquids and, more particularly, to a process for stabilizing liquids containing appreciable quantities of acidic gas constituents.

In processes involving multi-component liquids such as hydrocarbon condensates, crude oils, or partially refined liquids, it is frequently necessary to stabilize the liquid by distilling off low boiling point components in stabilizer columns. Where a liquid to be stabilized includes acidic gas constituents such as hydrogen sulfide or carbon dioxide, particularly in appreciable quantities, considerations of stabilizer column size make it desirable that the build-up of large internal recycling of the low boiling point acidic gas constituents be avoided. Furthermore, the presence of these constituents in the overhead vapor product of a stabilizer column makes necessary the use of lower temperatures and/or higher pressures in condensers used with such columns for condensation of reflux or overhead liquid product. In many instances, a requirement for a lower condenser temperature can be met only by external refrigerating systems because such lower temperatures are below the limits of plant cooling water. On the other hand, increased condenser pressures necessitate a higher reboiler temperature in the stabilizer column in order to maintain the reboiler boil-up rate. Higher reboiler temperatures not only result in increased cost for reboiler heat but frequently cannot even be utilized since the nature of the bottoms liquid is such that operations are conducted at the maximum allowable temperature that avoids thermal cracking, including cracking of complex sulfur compounds with resultant production of additional hydrogen sulfide.

The process of the present invention removes acidic gas constituents from overhead vapor in stabilizer columns, thereby promoting condensation of reflux or overhead liquid product and preventing the build-up of the concentration of such constituents in the reflux. In addition, a gas product and/or an overhead liquid product are obtained from the overhead vapor, which products, upon being withdrawn, are substantially free of acidic gas constituents.

The process of the present invention for stabilizing liquids containing acidic gas constituents includes the step of heating such a liquid to produce an overhead vapor including acidic gas constituents. The overhead vapor is then contacted with an aqueous alkaline solution of a reagent that unites with acidic gases. The mixture of overhead vapor and alkaline solution is cooled and then separated to provide an alkaline solution rich in absorbed acidic gas constituents and a gas product substantially free of such constituents.

The aqueous solution is of an alkaline reagent which readily unites with weakly-acidic gases at comparatively low temperatures and which can be regenerated for reuse by heating. Such reagents have been previously proposed and used in many processes for the removal of acidic gases from hydrocarbon gases. Preferably, the alkanolamines, particularly monoethanolamine, diethanolamine, or triethanolamine, are used in the practice of the present invention. However, other alkaline reagents such as the alkali metal carbonates and the alkali metal phosphates can also be used.

The practice of the process of the present invention effectively removes acidic gas constituents from the overhead vapor in a stabilizer column and, in stabilizer columns where the principal object is to remove such constituents from the bottoms liquid, the practice of the process reduces the reflux ratio and, consequently, the column diameter for the same number of trays. Since it decreases the internal recycle, the practice of the process also reduces the necessary diameter of the stabilizer column, thereby achieving economies in initial cost of equipment. Furthermore, its practice results in savings in operating costs by permitting operation of the condenser in association with the stabilizer column at higher temperatures and/or lower pressures than could be effectively utilized without the practice of the process of this invention. Also, when used in conjunction with an alkaline solution contactor to provide a final alkaline solution wash, the process of this invention produces a gas product having a high degree of purity without pressure reduction prior to such wash. As a consequence, the necessity for subsequent recompression of the gas product is eliminated and smaller capacity equipment may be used because of the small quantity of acidic gas constituents in the product entering the final alkaline solution wash.

The details of the process of the present invention, as well as the operation of a typical and illustrative embodiment, will be more fully understood from the following description made in conjunction with the accompanying flow sheet.

While the process of this invention is applicable with respect to various liquids containing appreciable quantities of acidic gas constituents, it is described below with reference to stabilization of a hydrocarbon condensate containing acidic gas constituents. Furthermore, it is described for convenience with reference to use of an amine solution. It will be understood that the description of the process in this manner is not intended to limit its applicability to either hydrocarbon condensates or amine solutions.

A hydrocarbon condensate enters a stabilizer column 10 through a feed line 12. The condensate is a multi-component mixture of low-boiling, intermediate-boiling, and high-boiling hydrocarbon components together with an appreciable quantity of acidic gas constituents. The condensate flows to the bottom of the stabilizer column and is heated by circulation through a reboiler 14 within which it is partially vaporized. Steam to the reboiler is furnished through a line 16 and leaves as condensate by a line 18. The liquid remaining in the reboiler after vaporization leaves by a line 20 and passes to storage. Hot vapors from the reboiler are circulated through a line 22 into the bottom of the stabilizer column where they countercurrently heat the liquid flowing down the column.

Low boiling point and some intermediate boiling point hydrocarbon components, as well as the acidic gas constituents of the condensate, are volatilized within the stabilizer and leave the top of the stabilizer as overhead vapor through a line 24. An aqueous amine solution entering by a line 26 is mixed with the overhead vapor and the mixture passes through a line 28 into a condenser 30. Water to cool the overhead product-amine mixture by indirect heat transfer enters the condenser by a line 32 and leaves by a line 34. Within the condenser, heavier components of the overhead product are condensed and substantially all of the acidic gas constituents in the overhead product are absorbed in the amine solution. The cooled three-phase mixture leaves the condenser by a line 36 and passes into a reflux drum separator 38.

The reflux drum separator is a conventional separator for making gas-liquid and liquid-liquid separations. The gas phase, consisting of low boiling point hydrocarbon components substantially free of acidic gas constituents, is separated from the liquid phase and leaves the separator by a line 40. The amine solution including absorbed acidic gas constituents is separated from condensed hydrocarbon components and leaves the separator by a line 42. Condensed hydrocarbon components leave the separator by a line 44 and are forced by a pump 46 either through a line 48 into the stabilizer column as reflux near its top, or through a line 50 to storage.

While not essential, a water separator tray 52 is provided near the top of the stabilizer column below the point at which reflux line 48 enters the column. The water separator tray recovers any amine carry-over from the reflux drum separator. Such amine carry-over passes through a line 54 to a water separator drum 56. Hydrocarbon liquid separated in drum 56 is returned to the stabilizer column by a line 58 while recovered amine passes through a line 60 and is mixed in line 32 with rich amine solution leaving the reflux drum separator.

If the process of the present invention is used in a plant that includes no other amine treating system, the rich amine solution from the separator is passed through a heat exchanger 62 and into a conventional regenerator 64. Optionally, the amine solution leaving the heat exchanger may be passed through a rich solution flash tank 66 before it enters the regenerator. Within heat exchanger 62, the rich amine solution is heated by passing in indirect heat transfer relationship with hot lean amine solution leaving the bottom of a regeneration column 64. The preheated rich amine solution, after being flashed to a lower pressure in flash tank 66, enters the upper portion of the regeneration column. The amine solution is reboiled with steam by means of a reboiler 68 to provide countercurrent stripping and to heat the amine solution, thereby liberating substantially all of the absorbed acidic gas constituents as the solution flows downwardly through the stripper. Acidic gas constituents leave the top of the regeneration column through a line 70 and pass through a water-cooled condenser 72 and a separator drum 74 in which condensed liquids are separated from the acidic gas constituents. Condensed liquids are returned to the column through a line 76 while acidic gas constituents are removed through a line 78.

The hot lean amine solution is used to preheat rich amine solution in heat exchanger 62 as previously described. The cooled lean amine solution leaving the heat exchanger is passed through line 26 where it is mixed with overhead vapor from the stabilizer column as previously described.

If an amine system exists within the plant in which the process of the present invention is used, lean amine solution can be withdrawn from the regenerated solution line of such a system after the lean solution heat exchanger but before the lean solution cooler. The rich amine solution can be returned to the rich solution flash tank or the solution heat exchanger of the existing system.

The gas product leaving the reflux drum separator by line 40 is sufficiently purified of acidic gas constituents so as to be used directly for plant fuel in most areas. When the amount of this product exceeds the fuel requirements of the plant, or where it is desirable to further process it to purify it to meet gas pipeline specifications, the gas product may be treated in an amine contactor. However, the prior treatment by the process of the present invention greatly simplifies any further treatment of the gas because of the small quantity of acidic gas constituents remaining in the gas product.

The following example will illustrate further the advantages of the process of the present invention.

*Example*

A stabilizer column was operated at 250 p.s.i.g. with a 480° F. bottoms temperature and a 110° F. overhead condenser. The composition of the feed entering the column was approximately the following in mol percent:

| | Percent |
|---|---|
| Methane | 5 |
| Carbon dioxide | 1 |
| Ethane | 7 |
| Hydrogen sulfide | 11 |
| Propane | 15 |
| Butanes | 10 |
| Pentanes | 5 |
| Hexanes | 5 |
| Heptanes and heavier | 41 |
| | 100 |

The bottoms liquid product was 7,000 to 8,000 barrels per day of 45° API stabilized crude containing less than 0.1% by weight $H_2S$. An aqueous solution containing 14% by weight monoethanolamine was injected into the overhead vapor line at a rate of 200 gallons per minute and absorbed about 110 mols per hour of $H_2S$ and $CO_2$ to make a substantially acidic gas-free overhead vapor product and reflux. Essentially complete separation of rich amine solution and hydrocarbon liquid was accomplished in the reflux drum separator. A water separator tray in the stabilizer and a water separator drum were installed but proved to be unnecessary.

For purposes of clarity, certain apparatus such as pumps, by-pass valves, expansion valves, surge tanks and the like have not been shown in the flow sheet. The appropriate use of such equipment will be apparent to those skilled in the art, and the inclusion of such in the flow sheet is not necessary to provide an understanding of the process of the present invention.

I claim:

A process for stabilizing multi-component hydrocarbon liquids containing acidic gas constituents, which process comprises the steps of
 (a) heating the hydrocarbon liquid in a column to produce an overhead vapor including hydrocarbon components and acidic gas constituents,
 (b) contacting the overhead vapor with an aqueous solution of a reagent selected from the group consisting of alkanolamines, alkali metal carbonates, and alkali metal phosphates,
 (c) cooling the overhead vapor-aqueous reagent solution to condense at least part of the hydrocarbon components,
 (d) separating a gas product and condensed hydrocarbon product, each substantially free of acidic gas constituents, from the reagent solution rich in absorbed acidic gas constituents,
 (e) returning at least part of the condensed hydrocarbon product as reflux to the column,
 (f) regenerating the rich reagent solution by heating to remove absorbed acidic gas constituents, and
 (g) contacting the overhead vapor with regenerated reagent solution.

References Cited in the file of this patent

UNITED STATES PATENTS

| | | |
|---|---|---|
| 1,715,095 | Morrell et al. | May 28, 1929 |
| 2,040,096 | Miller | May 12, 1936 |
| 2,621,216 | White | Dec. 9, 1952 |
| 2,908,640 | Dougherty | Oct. 13, 1959 |
| 2,938,851 | Stedman | May 31, 1960 |
| 2,973,316 | Howland | Feb. 28, 1961 |
| 2,990,431 | Cabbage | June 27, 1961 |